United States Patent
Behnsen et al.

(10) Patent No.: US 12,214,715 B2
(45) Date of Patent: Feb. 4, 2025

(54) FUNCTION MODULE FOR AT LEAST ONE LIGHT FUNCTION AND/OR AT LEAST ONE SENSOR FUNCTION HAVING A FIRST FRAME THAT IS MOVABLE RELATIVE TO A SECOND FRAME

(71) Applicant: Bayerische Motoren Werke Aktiengesellschaft, Munich (DE)

(72) Inventors: Dominik Behnsen, Dasing (DE); Josef Gruebl, Neumarkt-St.Veit (DE); Andreas Lang, Groebenzell (DE); Martin Riedner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/558,807

(22) PCT Filed: May 31, 2022

(86) PCT No.: PCT/EP2022/064740
§ 371 (c)(1),
(2) Date: Nov. 3, 2023

(87) PCT Pub. No.: WO2022/253823
PCT Pub. Date: Dec. 8, 2022

(65) Prior Publication Data
US 2024/0227662 A1    Jul. 11, 2024

(30) Foreign Application Priority Data

Jun. 2, 2021 (DE) ...................... 10 2021 114 257.1

(51) Int. Cl.
*B60Q 1/04* (2006.01)
*B60Q 1/00* (2006.01)
(Continued)

(52) U.S. Cl.
CPC ......... *B60Q 1/0408* (2013.01); *B60Q 1/0023* (2013.01); *B60Q 1/0491* (2013.01);
(Continued)

(58) Field of Classification Search
CPC ............................ B60Q 1/0491; B60Q 1/0408
See application file for complete search history.

(56) References Cited

U.S. PATENT DOCUMENTS

| 6,478,456 B1 | 11/2002 | Eichhorn et al. |
| 2007/0279925 A1 | 12/2007 | Jocher |

(Continued)

FOREIGN PATENT DOCUMENTS

| DE | 38 02 104 A1 | 8/1989 |
| DE | 100 62 735 A1 | 6/2002 |

(Continued)

OTHER PUBLICATIONS

International Search Report (PCT/ISA/2010) issued in PCT Application No. PCT/EP2022/064740 dated Sep. 16, 2022 with English translation (6 pages).

(Continued)

*Primary Examiner* — Robert J May
(74) *Attorney, Agent, or Firm* — Crowell & Moring LLP

(57) ABSTRACT

A function module includes at least one lighting unit and/or at least one sensor unit. The function module also includes a covering panel through which light from the at least one lighting unit emerges from the function module and/or by way of which the detection region of a respective sensor unit extends out of the function module. The function module also includes a first frame and a second frame, with the covering panel being provided on the first frame and the second frame being configured for rigid attachment to the motor vehicle. The first frame is movable from a nominal position relative to the second frame should the action of a (Continued)

force be directed against the frame toward the covering panel from the outside. A returning device is provided in order to return the first frame to the nominal position once the action of the force has ceased.

20 Claims, 9 Drawing Sheets

(51) Int. Cl.
    *F21S 41/19*     (2018.01)
    *F21S 41/20*     (2018.01)
    *F21W 102/13*     (2018.01)

(52) U.S. Cl.
    CPC ............ *F21S 41/192* (2018.01); *F21S 41/28* (2018.01); *B60Q 2400/30* (2013.01); *F21W 2102/13* (2018.01)

(56) References Cited

U.S. PATENT DOCUMENTS

| | | |
|---|---|---|
| 2018/0231206 A1 | 8/2018 | Hara et al. |
| 2019/0204528 A1 | 7/2019 | Oshima et al. |

FOREIGN PATENT DOCUMENTS

| | | | |
|---|---|---|---|
| DE | 102 58 628 A1 | 7/2004 | |
| DE | 60 2004 001 456 T2 | 2/2007 | |
| DE | 20 2009 006 677 U1 | 9/2009 | |
| DE | 11 2017 003 548 B4 | 3/2021 | |
| EP | 1 059 200 A2 | 12/2000 | |
| EP | 1288068 A1 * | 3/2003 | ........... B60Q 1/0491 |
| JP | 2005-186738 A | 7/2005 | |
| KR | 2003-0000251 A | 1/2003 | |
| WO | WO 2005/058640 A1 | 6/2005 | |

OTHER PUBLICATIONS

German-language Written Opinion (PCT/ISA/237) issued in PCT Application No. PCT/EP2022/064740 dated Sep. 16, 2022 with English translation (9 pages).

German Search Report issued in German Application No. 10 2021 114 257.1 dated Dec. 1, 2021 with partial English translation (13 pages).

* cited by examiner

FUNCTION MODULE FOR AT LEAST ONE LIGHT FUNCTION AND/OR AT LEAST ONE SENSOR FUNCTION HAVING A FIRST FRAME THAT IS MOVABLE RELATIVE TO A SECOND FRAME

BACKGROUND AND SUMMARY

The invention relates to a function module for at least one light function and/or sensor function in a motor vehicle and to a corresponding motor vehicle.

Providing function modules for implementing light functions or sensor functions in a motor vehicle is known from the prior art. These function modules are often installed in the front of a motor vehicle and in addition to the main light functions (i.e., low beams and high beams) also perform further light functions here, such as daytime running light, position light, or direction indicator. Sensors for implementing driver assistance functions, such as radar or lidar sensors, are often also integrated in a corresponding function module. The requirement exists here of protecting the function module in the event of an impact at low speed, for example, parking bumps, against damage caused in this way.

The object of the invention is to provide a function module for at least one light function and/or sensor function in a motor vehicle, in which the risk of damage of the components installed therein is kept low in the event of an impact at low speed.

This object is achieved by the function module according to the claimed invention.

The function module according to embodiments of the invention is provided for a motor vehicle, such as a passenger car and possibly also a truck. When interactions between the function module and components of the motor vehicle are described hereinafter and in particular in the claims, this is always to be understood to mean that the interaction occurs during arrangement or installation of the function module in the motor vehicle. The components of the function module which have a corresponding interaction with the motor vehicle or parts of the motor vehicle are therefore designed such that the interaction is induced during arrangement or during installation of the function module in the motor vehicle.

The function module according to embodiments of the invention contains one or more lighting units for emitting light into the surroundings of the motor vehicle and/or one or more sensor units for detecting objects in a detection area in the surroundings of the motor vehicle in order to implement a corresponding light function or sensor function, respectively. Here and hereinafter, light is to be understood as optical radiation in a wavelength range visible to the human eye.

The function module according to embodiments of the invention comprises a cover plate or exterior light plate, via which light from the lighting unit or the lighting units exits from the function module and/or via which the detection area of a respective sensor unit extends out of the function module. The function module according to embodiments of the invention furthermore comprises a first frame and a second frame, wherein the cover plate is provided on the first frame and the second frame is configured for rigid fastening to the motor vehicle. The first frame is movable out of a nominal position relative to the second frame in the event of a force action directed at the first frame (i.e., in the event of a force exerted on the first frame) from the outside toward the cover plate. A force action from the outside toward the cover plate is to be understood here as the exertion of a force on the first frame which has a component in the thickness direction of the cover plate toward the interior of the function module, wherein the force preferably does not act directly, but rather indirectly via the first frame, on the cover plate. The function module furthermore contains a returning device for moving the first frame back into the nominal position after the force action is ended.

The function module according to embodiments of the invention has the advantage that damage to the function module in the event of an impact at low speed (for example, parking bump) is avoided by the reversible movement of a first frame, on which the cover plate is provided, relative to a vehicle-fixed second frame.

The function module according to embodiments of the invention can contain different components depending on design. The function module preferably comprises one or more first lighting units for generating a light distribution for a low beam function and/or a high beam function. In one preferred variant, the first lighting unit or the first lighting units are mechanically connected to the second frame, wherein the connection is in particular a rigid connection and possibly also a direct connection (i.e., without further bridging parts) between the corresponding first lighting units and the second frame. In this way, spacing between the first lighting units and the cover plate is achieved, so that damage to the first lighting units by the movable cover plate is avoided. The function module according to the embodiment just described is provided for installation in the front of the motor vehicle due to the low beam function or high beam function and therefore at least has the function of a front headlight.

In a further preferred embodiment, the function module according to the invention comprises one or more second lighting units for generating a light distribution for a daytime running light and/or for a position light and/or for a directional indicator or for a surface lighting device along the cover plate and/or for a contour lighting device along an edge of the cover plate. The second lighting unit or the second lighting units are preferably mechanically connected to the cover plate and/or the first frame, wherein the connection is in particular a rigid connection and possibly also a direct connection (i.e., without further bridging parts) between the corresponding second lighting units and the cover plate or the first frame. This variant ensures that the second lighting units follow the movement of the cover plate in case of a force action, by which damage to these lighting units is avoided.

If one or more sensor units are installed in the function module, these—similarly to the above embodiment—are thus preferably mechanically connected to the cover plate and/or the first frame, wherein the connection is again preferably designed as rigid and possibly also direct without bridging parts between sensor unit and cover plate or first frame.

In a further preferred embodiment, at least one sensor unit (if provided) installed in the function module is configured to detect objects in the detection area via the emission and the reception of electromagnetic radiation. At least one sensor unit is preferably a radar sensor and/or a lidar sensor here. Therefore, routine sensor units used for driver assistance are installed in the function module according to embodiments of the invention.

The movement of the first frame relative to the second frame can be designed differently depending on the variant of the function module according to the invention. In one preferred embodiment, the first frame is displaceable and/or pivotable relative to the second frame in the event of a force action directed at the first frame from the outside toward the cover plate.

In a further preferred embodiment, the returning device connects the first frame to the second frame at least at one point. Alternatively or additionally, the returning device can also be provided at least at one point to connect the first frame to a fixed part in the motor vehicle not associated with the function module.

In a further preferred embodiment, the returning device comprises one or more elastic elements, wherein the one or more elastic elements preferably comprise one or more springs. To ensure good movability of the first frame relative to the second frame, multiple elastic elements are preferably arranged at the edge of the first frame and preferably circumferentially around this edge in a top view of the cover plate.

In a further, particularly preferred embodiment, the first frame is guided relative to the second frame in order to permit only a movement of the first frame relative to the second frame in a number of predetermined directions in the event of a force action on the first frame from the outside toward the cover plate. The concept of the number of predetermined directions can possibly also be given here by a continuous solid angle range of directions, in which the movement of the first frame relative to the second frame is possible. Furthermore, it is not necessarily required for the guide of the first frame relative to the second frame to be formed between the first frame and the second frame. Rather, the first frame can also be guided on a part other than the second frame, provided that it carries out a guided movement relative to the second frame.

In one preferred variant of the above-described embodiment, one or more cupola-shaped elevations and/or one or more rotating fasteners provided on the first frame are provided for guiding the first frame relative to the second frame. The cupola-shaped elevation(s) are preferably arranged between the first frame and the second frame. In particular, the cupola-shaped elevation(s) can be provided on the second frame and can contact the first frame at the same time. The cupola-shaped elevation(s) can also be provided on the first frame and contact the second frame at the same time.

In a further preferred embodiment, a locking device is furthermore provided in order to lock the first frame in the nominal position, wherein the locking device is designed such that the locking is released from the nominal position in the event of a force action on the first frame from the outside toward the cover plate above a predetermined magnitude.

In one preferred variant, the above-described locking device comprises one or more catch lugs, which engage in one or more corresponding depressions upon locking in the nominal position. For example, one or more catch lugs can be provided on the second frame and engage in corresponding depression(s) of the first frame. One or more catch lugs can also be provided on the first frame and engage in corresponding depression(s) of the second frame. One or more catch lugs can optionally also be formed on the above-described cupola-shaped elevation(s).

In a further preferred embodiment, the first frame is a first housing section and the second frame is a second housing section, wherein the first housing section and the second housing section are connected to one another to form a seal (i.e., a seal in relation to dust and dirt) and form a closed housing, in which at least one lighting unit and/or at least one sensor unit are arranged. If the corresponding lighting unit or the corresponding sensor unit does not comprise its own housing for its protection, the protection of these units is achieved in this way via the corresponding housing sections.

In a further preferred embodiment, a flexible jacket, such as a sealing collar, and/or a hollow chamber seal is provided for the sealing connection of the first housing section to the second housing section.

In addition to the above-described function module, the invention relates to a motor vehicle which comprises one or more of the function modules according to embodiments of the invention.

Exemplary embodiments of the invention are described in detail hereinafter on the basis of the appended figures.

DETAILED DESCRIPTION OF THE DRAWINGS

Figure 1:
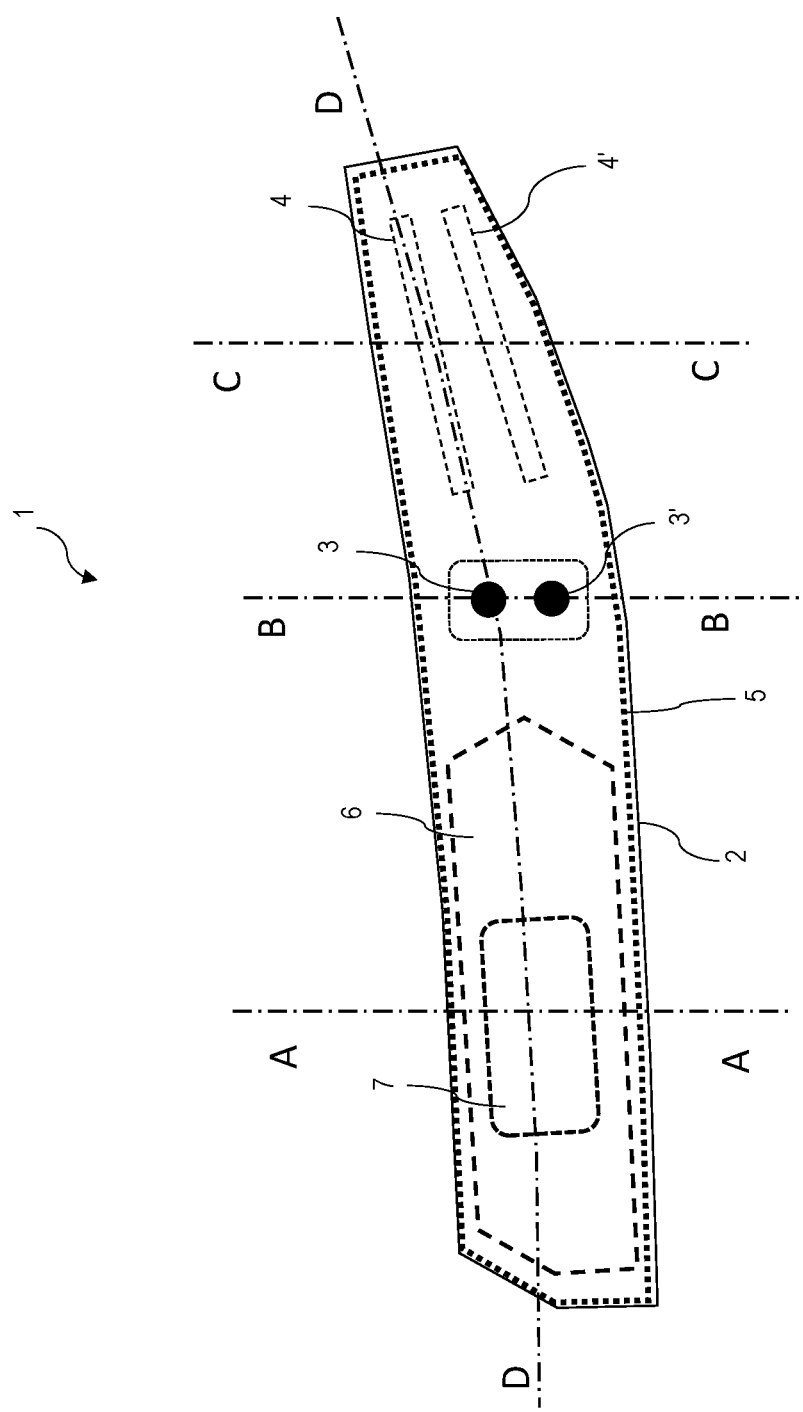
FIG. 1 shows a schematic representation of an embodiment of the function module according to the invention in a top view of its cover plate.

Exemplary embodiments of the invention are described hereinafter on the basis of a function module, which is located in the front of a motor vehicle in its left area and, inter alia, has the functionality of the left front headlight. This function module is illustrated solely schematically in FIG. 1 in a top view of the front of the motor vehicle and is identified by reference sign 1. The cover plate 2 of the function module can be seen here, wherein the components, using which light functions and sensor functions are implemented and which are located behind the cover plate, are schematically shown. The edge of the function module located on the left side in FIG. 1 is located adjacent to the vehicle center, whereas the right edge of the function module extends around the left corner of the motor vehicle (viewed in the direction of travel). In other words, the cover plate is bent at its end located adjacent to the left fender of the motor vehicle.

The function module (not shown) on the other side of the vehicle front is designed in the same way. That is to say, its cover plate extends essentially from the vehicle center up to the right fender. In this way, an appealing image of a continuous surface on the front of the motor vehicle is achieved by the function modules installed on either side. The integration of a pocket on the vehicle front is omitted here.

The function module 1 comprises two lighting units 3 and 3', which are solely schematically indicated, having corresponding optical units, wherein the headlight function of the function module is implemented by the two lighting units. In other words, the two lighting units 3 and 3' are used to generate the low beam and the high beam. According to FIG. 1, two signal lighting units 4, 4', which are again only schematically illustrated as bars and are used jointly to generate the daytime running light during a journey in daylight and to generate the position light during a journey in darkness, are located on the right adjacent to the lighting units 3 and 3'. During the generation of the daytime running light and the position light, the signal lighting units 4 and 4' emit white light. Furthermore, the signal lighting unit 4 also performs the function of the directional indicator. That is to say, upon the activation of the directional indicator, flashing of the signal lighting unit 4 in yellow color is effected, so that during the flashing the function of the daytime running light or the position light of this signal lighting unit is deactivated. After ending the flashing, the signal lighting unit 4 again lights up in the white color of the daytime running light or position light.

Furthermore, a contour lighting device 5, which is again illustrated solely schematically by a dotted circumferential line, extends circumferentially around the edge of the cover plate 2. The counter lighting device 5 is implemented by a circumferential optical fiber. An appealing appearance of the front of the motor vehicle is achieved by the activation of the contour lighting device 5. In addition, furthermore an optional surface lighting device 6 is shown in FIG. 1, which is provided in the left area of the cover plate and is solely illustrated in dashed lines by its outline. In the description of the following embodiments, it is presumed that this optional surface lighting device 6 is not provided. Upon the activation of the surface lighting device 6, a light surface is generated within its outline. The surface lighting device 6 can be designed, for example, as a planar light guide or as a planar lighting element in the form of an array made up of LEDs. A pattern and/or a decoration can possibly be provided on the cover plate 2 in the area of the surface lighting device 6, so that a light pattern or a luminous decoration appears upon the activation of the surface lighting device 6. The decoration can represent, for example, the emblem or logo of the producer of the motor vehicle.

In areas of the cover plate behind which no surface lighting device is located, the cover plate is largely made light-transmissive or transmissive, wherein the transmittance is preferably above 50% and particularly preferably 90% or more for visible light. Furthermore, a sensor unit in the form of a radar 7, which is used for driver assistance functions and in particular for detecting objects and measuring the distance to them in the surroundings of the motor vehicle, is located behind the surface lighting device 6. The surface lighting device 6 is designed here such that it is transmissive to the radar beams emitted by the radar 7. This is also true for the light-opaque areas of the corresponding pattern or decoration, which can be provided in front of the surface lighting device on the cover plate.

In the embodiment of the function module 1 described here, the inner surface of the function module visible via the cover plate 2 is made light absorbing or dark. In this way, an essentially dark surface in the area of the cover plate appears as cold to an observer, i.e., when none of the lighting units provided in the interior of the function module is switched on.

Figure 2:
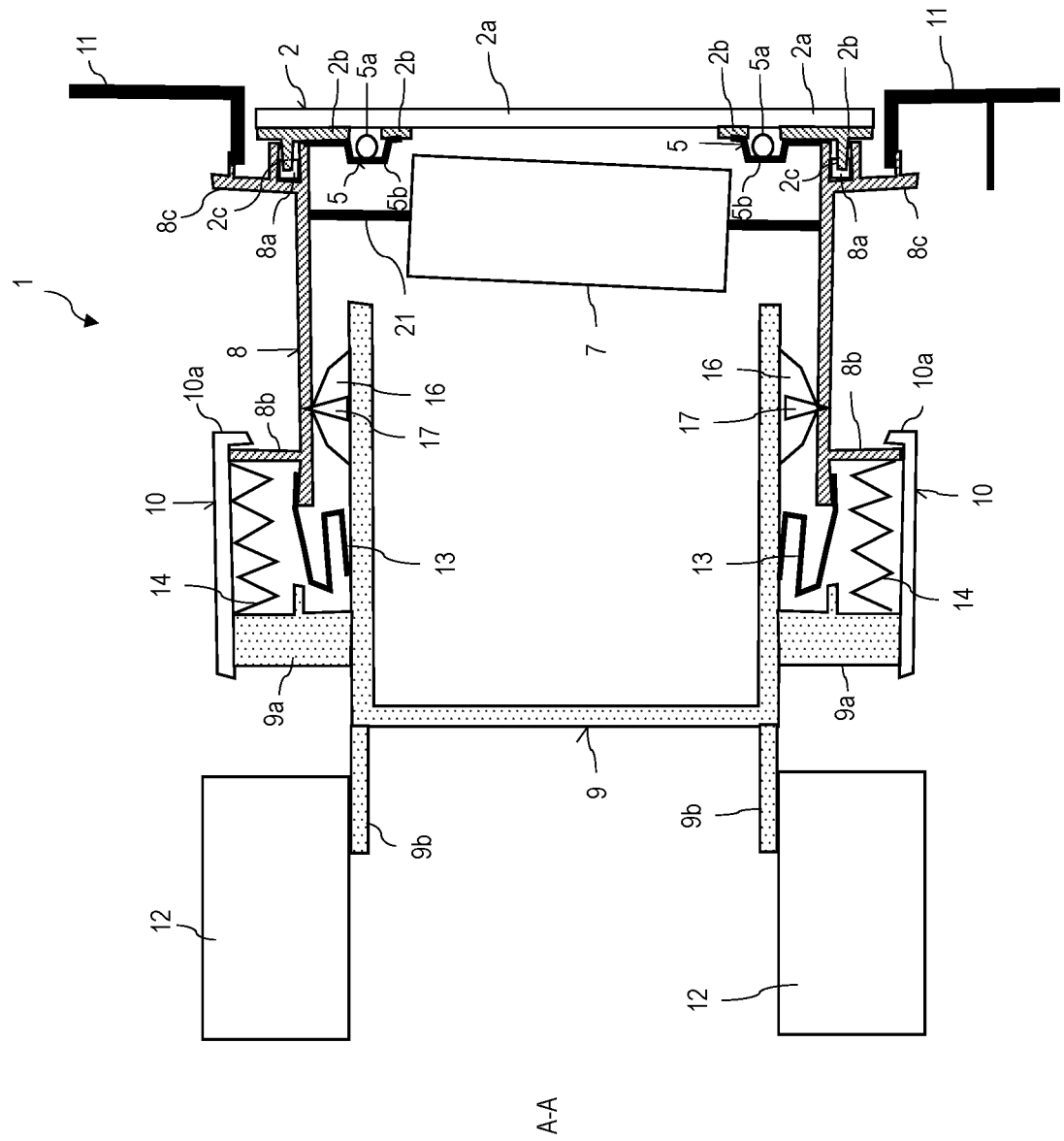
FIG. 2 shows a sectional view along line A-A of FIG. 1.
Figure 3:
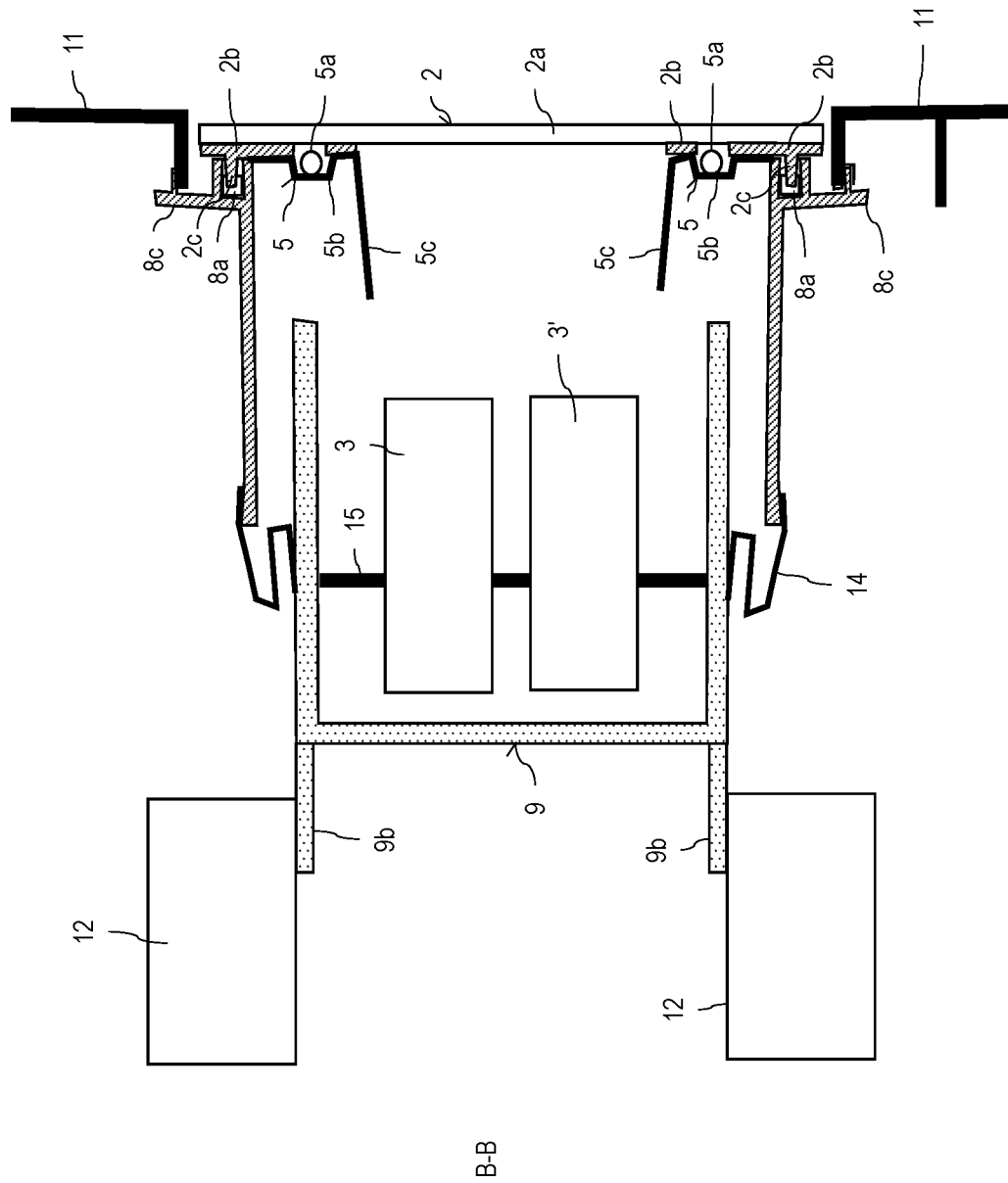
FIG. 3 shows a sectional view along line B-B of FIG. 1.
Figure 4:
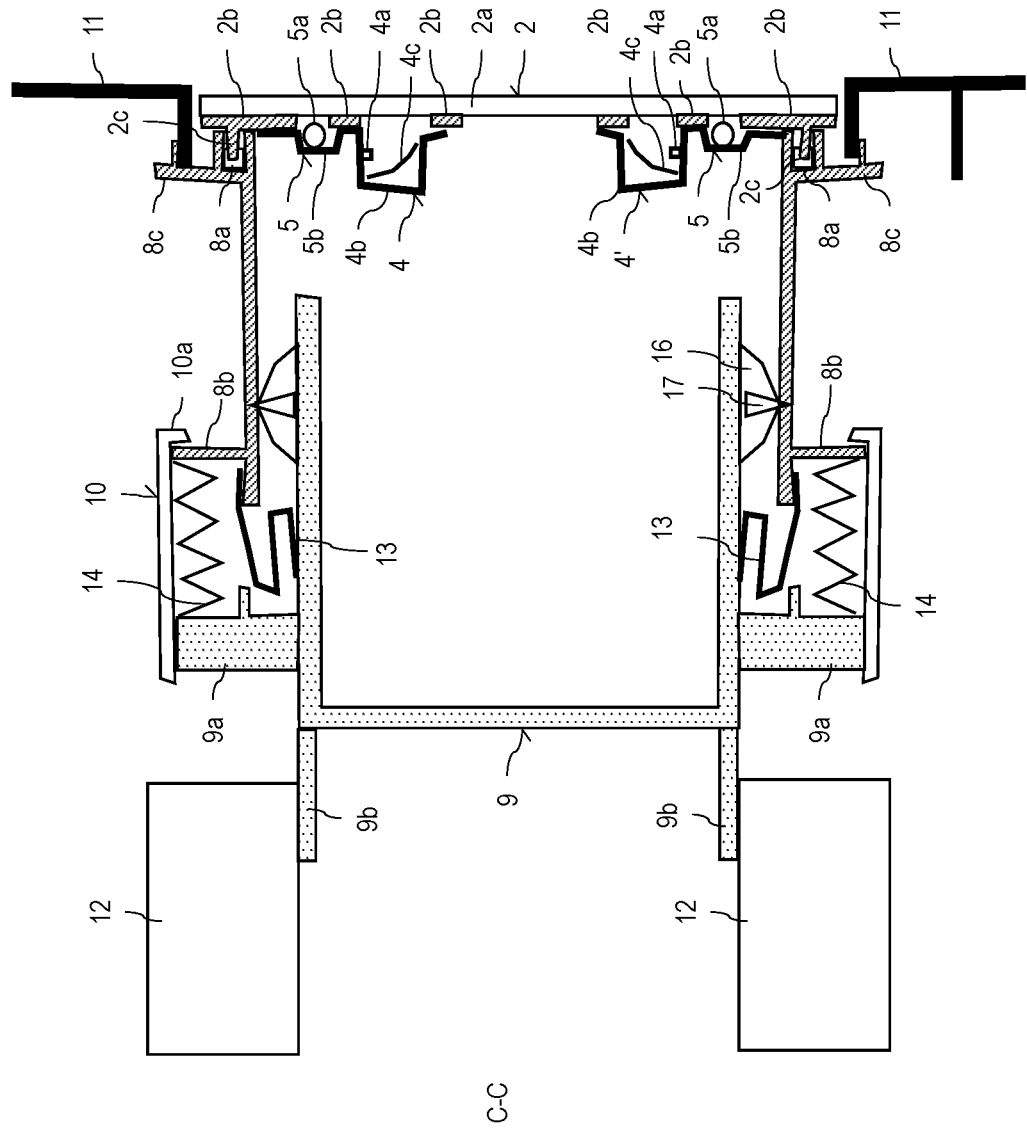
FIG. 4 shows a sectional view along line C-C of FIG. 1.
Figure 5:
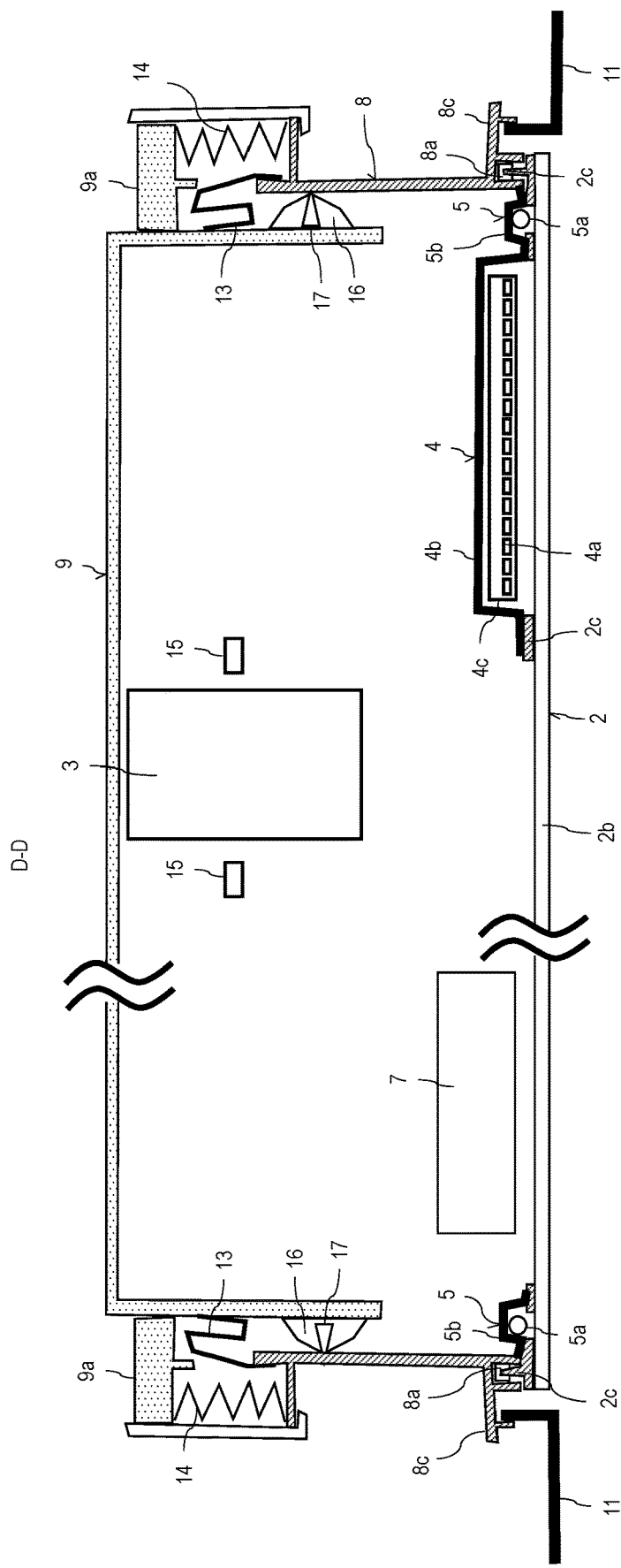
FIG. 5 shows a sectional view along line D-D of FIG. 1.

Furthermore, four dot-dash lines of section A-A, B-B, C-C, and D-D are indicated in FIG. 1. The sections along the vertical lines of section A-A, B-B, and C-C are indicated in FIG. 2, FIG. 3, and FIG. 4 respectively. In these figures, the viewing direction of the respective sections is illustrated from left to right according to FIG. 1. The horizontal section D-D is shown in FIG. 5, wherein the viewing direction in this figure is the vertical direction from top to bottom.

It is apparent from the sectional illustration of FIG. 2 that the function module 1 comprises a first frame 8 and a second frame 9. The first frame 8 is illustrated here by a shading inclined to the left, whereas the second frame 9 is represented by a dot pattern. The two frames are designed as essentially rectangular, wherein the frame 9 is furthermore closed on its rear side. In the embodiment described here, the two frames 8 and 9 form two housing sections, which are connected to one another in a dust-tight and dirt-tight manner and in this way form a closed housing for protection of components provided therein, as will be described in more detail hereinafter.

As can be seen from FIG. 2, on one side of the first frame 8 the cover plate 2 is located, which is received via a circumferentially protruding section 2c in a corresponding depression 8a of the first frame 8 and is fastened there to form a seal, for example, by way of an adhesive. The cover plate 2 is a two-component injection molded part here, wherein the one component is a transmissive plastics layer 2a and the other component is an opaque plastics layer 2b, which however is only provided in partial areas on the transmissive layer 2a and is indicated by a shading inclined to the right. Components of the function module are fastened to the opaque layer 2b, as will be explained in more detail hereinafter. In addition, the above-mentioned protruding section 2c is formed on the opaque layer 2b.

Furthermore, the radar 7, which is rigidly connected to the first frame 8 via a suitable supporting frame 21, can be seen in the sectional illustration of FIG. 2. In addition, the contour lighting device 5 is apparent in the section. This contour lighting device 5 contains a light guide 5a, which is supplied at a coupling point (not shown) with light from a light source in the form of an LED. The light guided through the light guide 5a exits forward out of the light guide in the direction toward the cover plate via an output coupling structure here, due to which a circumferential light band results and the contour of the cover plate 2 is thus highlighted. The light guide 5a is received within a rear housing 5b of the contour lighting device 5. The rear housing is suitably fastened (for example adhesively bonded) on the opaque layer 2b of the cover plate 2.

The first frame 8 is rigidly connected to the bumper panel 11 of the motor vehicle. For this purpose, a circumferential section 8c, via which the fastening to the bumper panel 11 takes place and which protrudes in the vertical direction, is provided on the frame 8. In contrast, the second frame 9 is rigidly connected via the protruding sections 9b to vehicle-fixed parts 12 (only schematically illustrated), such as the vehicle body. The first frame 8 is displaceable relative to the second frame 9 reversibly in the direction toward the interior of the motor vehicle in the event of a force action from the outside on the bumper or its panel 11. In this manner, it is ensured that in the event of an impact with little force, for example, a parking bump, the frame 8 is also moved as the bumper is pressed in and in this way an excessive introduction of force into the function module with possible damage thereto is avoided.

In order to enable the function of the reversible displaceability of the first frame 8 in relation to the frame 9, a returning device in the form of multiple springs 14 is arranged between the first frame 8 and the second frame 9. A total of six springs are provided along the circumference of the second frame, wherein two springs are arranged on the upper side, two springs are arranged on the lower side, and one spring is arranged in each case on the right and left side of the second frame. This number of springs is solely by way of example and a different number of springs can also be provided. Furthermore, the frame 8 is guided relative to the frame 9 with the aid of cupola-shaped elevations 16, which are provided circumferentially around the frame 9. Similarly to the springs 14, two cupola-shaped elevations are attached to the lower side of the frame 9, two cupola-shaped elevations are attached to the upper side of the frame 9, and one cupola-shaped elevation is attached in each case to the left and right side of the frame 9. The number of the elevations is solely by way of example and more or fewer elevations can also be provided.

The respective cupola-shaped elevations 16 abut the inside of the first frame 8, by which a sliding movement of the first frame 8 in relation to the second frame 9 is enabled and at the same time jamming of the two frames 8 and 9 is avoided. In the illustration of FIG. 2, the first frame 8 is located in the nominal position, which is assumed without force action from the outside. In this position, corresponding catch lugs 17, which are provided on the cupola-shaped elevations, engage in depressions (not shown) on the inside of the first frame 8. A locking device for locking the frame 8 in the nominal position is thus provided by the catch lugs 17. If the force exerted on the bumper exceeds a specific amount, the catch lugs jump out of the depressions and the first frame 8 can be displaced along the cupola-shaped elevations in relation to the frame 9.

The section according to FIG. 2 is selected such that it extends through two opposing springs 14 on the upper side and the lower side of the second frame 9. The springs 14 are each located between a protruding section 9a of the second frame 9 and a protruding section 8b of the first frame 8. In addition, the springs are each covered by a cover 10, at the front end of which a stop 10a is provided for the corresponding protruding section 8b of the first frame 8. If the section 8b of the first frame 8 abuts the stop 10a, the frame 8 is in the nominal position, i.e., the catch lugs 17 are located in the corresponding depressions on the inside of the first frame 8. In the event of a force action from the outside on the bumper, its deformation has the result that the frame 8 is moved inward, i.e., to the left in FIG. 2, sliding along the cupola-shaped elevations 17 and the corresponding springs 14 are compressed at the same time. As soon as the force action is ended, the bumper moves back outward again. The compressed springs 14 generate a returning force here, which ensures that the first frame 8 also moves back outward into its nominal position.

In the embodiment described here, a tightly closed housing is formed by the first frame 8 and the second frame 9. For this purpose, a flexible jacket 13 in the form of a sealing collar is formed in the circumferential direction around the first frame 8 and the second frame 9, wherein the collar is fastened in a sealing manner (for example adhesively bonded) on both the first frame and the second frame. In that a sealed housing space is created by the frames 8 and 9 in combination with the sealing collar 13, the parts of the function module located in the housing can be protected from dirt and dust. The function of this protection is relevant when the parts themselves do not have a separate housing. If the parts should already comprise a protective housing, the two frames 8 and 9 can also not be arranged in a sealed manner in relation to one another. Furthermore, the rear side of the second frame 9 can also be omitted in this case. It solely has to be ensured that the first frame 8 is reversibly movable in relation to the frame 9.

FIG. 3 shows a section along line B-B of FIG. 1. In FIG. 3 and also in the further figures, parts which have already been explained with reference to FIG. 2 are not described once again in detail. The section of FIG. 3 is selected such that it extends through the lighting units 3 and 3', wherein no springs 14 are located between the first frame 8 and the second frame 9 at this sectional position. The lighting units 3 and 3', which are only schematically shown, do not have a separate housing, so that it has to be ensured that the lighting units are externally protected from dirt. This is achieved by the formation of a sealing housing over the two frames 8 and 9 and it forming a seal using the sealing collar 14, as described above.

As is apparent from FIG. 3, the lighting units 3 and 3' are rigidly connected to the second frame 9 via a supporting frame 15 (only schematically indicated). The lighting units 3 and 3' are arranged spaced apart from the cover plate 2 in this manner. Furthermore, the contour lighting device 5 is again apparent in section from FIG. 3. A screen 5c extends here out of the housing 5b of the contour lighting device 5. The screen is an optional component and can possibly also be omitted.

FIG. 4 shows a section along line C-C of FIG. 2. The section is selected such that it extends through the two signal lighting units 4 and 4' at a position at which two opposing springs 14 are again located. It is apparent from FIG. 4 that the two signal lighting units comprise a light 4a, a reflector 4b, and a housing 4c, which is integrally formed together with the housing 5b of the contour lighting device Sand is fastened on the opaque layer 2b of the cover plate 2. The light 4a consists here of an array of LEDs, as is apparent from FIG. 5 described hereinafter. The light of the LEDs radiates onto the reflector 4c, which deflects the light outward.

FIG. 5 shows a horizontal section along line D-D of FIG. 1. The supporting frame 15 for fastening the lighting units 3 and 3' is only schematically indicated here. The section is again selected so that it extends through two opposing springs on the side walls of the second frame 9. The structure of the signal lighting unit 4 is once again apparent in detail from FIG. 5. In particular, it can be seen that the light 4a is formed from a large number of LEDs arranged adjacent to one another. Furthermore, it is apparent that all provided lighting units (i.e., the lighting units 3, 3', the signal lighting units 4, 4', and the contour lighting device 5) as well as the radar 7 are arranged inside the housing, which is formed by the first frame 8 and the second frame 9. However, it is not absolutely required here for the radar 7 to be arranged inside the housing, since the radar 7 comprises a separate housing and is thus already protected from dust and dirt. In other words, the closed housing can also be designed such that the radar 7 is located outside this housing. This is also true for the further lighting units with the exception of the lighting units 3, 3', since these lighting units are also already protected by a separate housing. Only the lighting units 3, 3' do not have a separate housing and therefore have to be arranged inside the housing formed by the frames 8 and 9.

Figure 6:
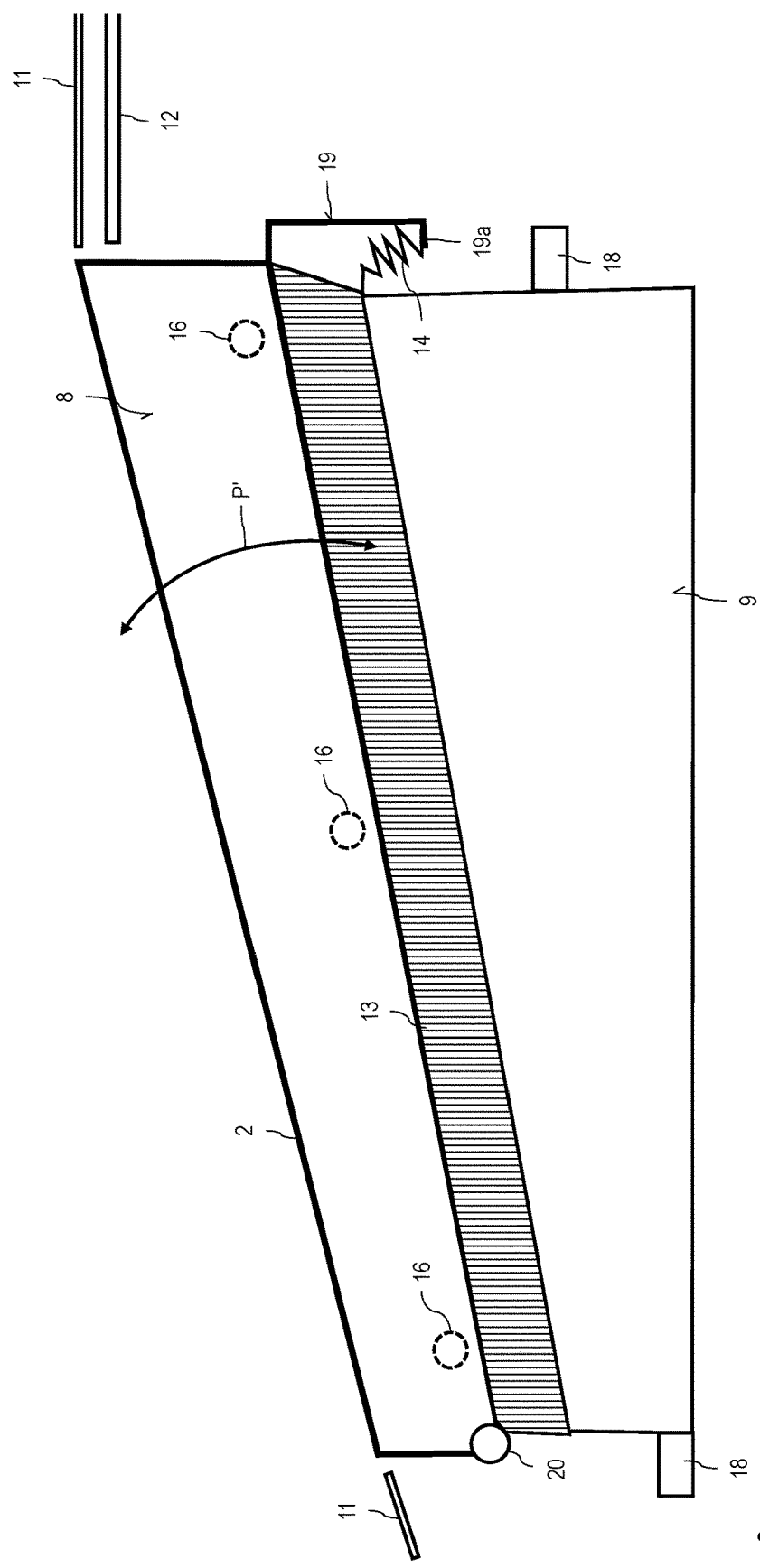
FIG. 6 shows a top view from above of a further embodiment of a function module according to the invention.

FIG. 6 is a top view from above of a further embodiment of a function module according to the invention. FIG. 6 shows here, in a solely schematic illustration, the first frame 8 having the cover plate 2 on the front side and the second frame 9, which is screwed onto vehicle-fixed parts via suitable fastening points 18 and is thus not movable. Furthermore, corresponding cupola-shaped elevations 16 can be schematically seen once again in FIG. 6, which ensure the guidance of the first frame 8 relative to the second frame 9 similarly to the preceding embodiments.

The sealing collar 13, which is indicated by a vertical shading, is located between the first frame 8 and the second frame 9. Furthermore, the bumper panel 11 and a vehicle-fixed part 12 behind the bumper panel are apparent from FIG. 6. In contrast to the preceding embodiments, the first frame 8 is connected via a rotating fastener 20 to the second frame 9. The rotating fastener enables pivoting of the first frame 8 around a vertical axis. The pivot movement is schematically indicated here by the double arrow P'. Furthermore, a holding element 19 is attached to the first frame 8. The tension spring 14, which ensures the return of the first frame 8 in the event of a force action from the outside, is located between a front section 19a of the holding element and a fastening point at the front end of the frame 9.

Figure 7:
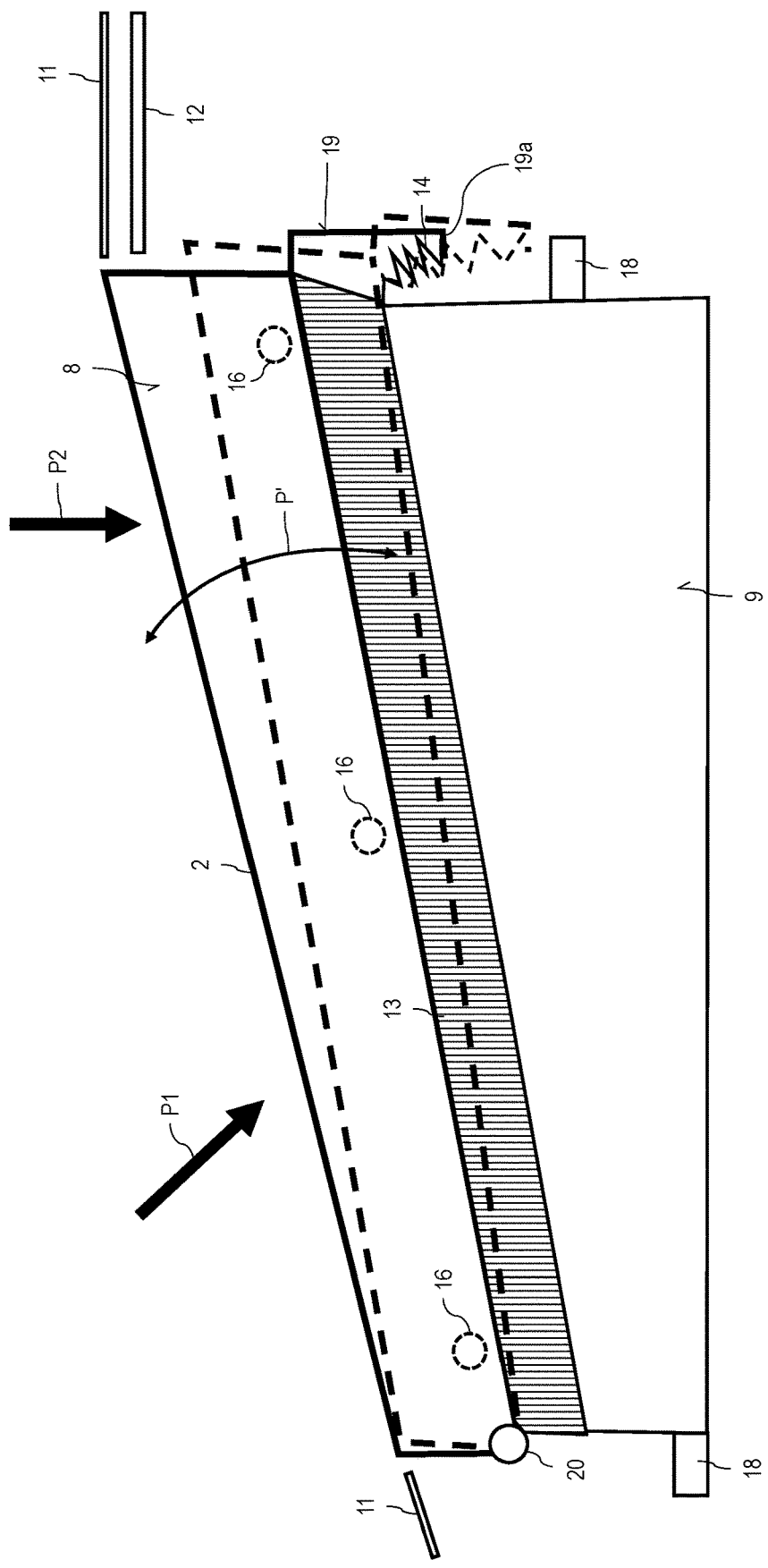
FIG. 7 shows a top view from above of the function module of FIG. 6 in the event of a force action on the first frame.

FIG. 7 shows, in an illustration similar to FIG. 6, the movement of the first frame 2 in the event of a so-called pendulum impact from the outside, which occurs, for example, in the event of denting while parked. Two directions of the pendulum impact are indicated by way of example here by arrows P1 and P2. Upon such force actions from the outside, the first frame 8 pivots relative to the second frame 9, wherein the pivoted position is indicated in FIG. 7 by dashed lines. The tension spring 14 is stretched as a consequence of the pivoting, by which an elastic returning force is generated. If the force action is ended again, the elastic returning force has the result that the frame 8 is moved back into its original nominal position.

Figure 8:
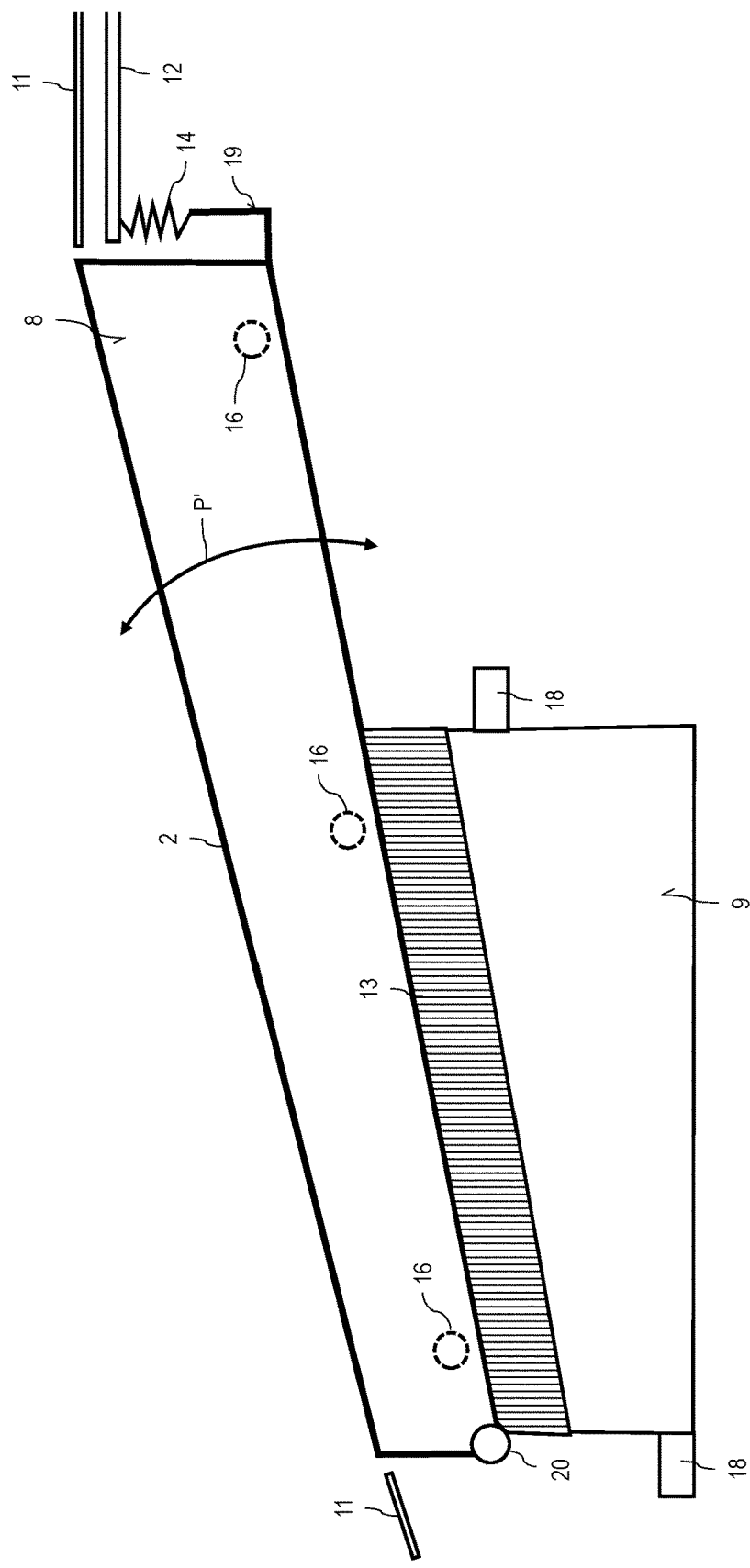
FIG. 8 shows a top view from above of a further embodiment of the function module according to the invention.

FIG. 8 in turn shows in a schematic top view from above an embodiment which is slightly modified from the embodiment of FIG. 6. As can be seen, the frame 9 is made smaller than in the embodiment of FIG. 6. This means that the radar 7 is not arranged inside the housing, which is formed by the first frame 8, the second frame 9, and the interposed sealing collar 13. Nonetheless, the lighting units 3 and 3' to be protected from dirt are still located inside this housing. Similarly to FIG. 6, in the embodiment of FIG. 8, the first frame 8 is connected via a rotating fastener 20 to the second frame 9, so that the first frame is rotatable around a vertical axis. A holding element 19 is also again provided, which is arranged differently than in the embodiment of FIG. 6, however, so that the corresponding tension spring 14 is no longer fastened on the second frame 9, but rather on the vehicle-fixed part 12.

Figure 9:
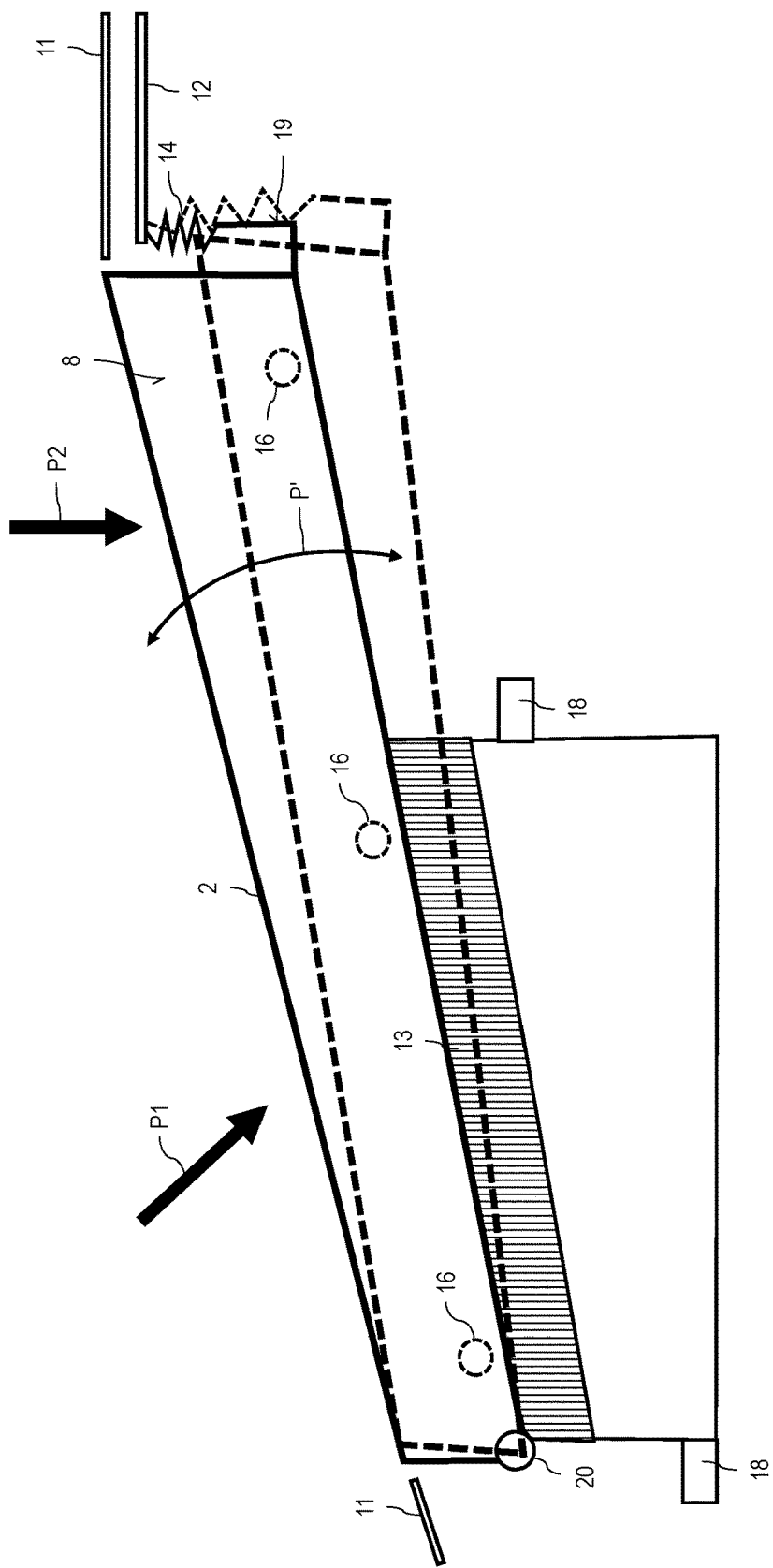
FIG. 9 shows a top view from above of the function module of FIG. 8 in the event of a force action on the first frame.

FIG. 9 shows, similarly to FIG. 7, a corresponding force action on the function module of FIG. 8. The force action is again indicated by corresponding arrows P1 and P2 and results in a pivot of the first frame 8 around a vertical axis. The pivoted position of the first frame 8 is shown by dashed lines. As can be seen, the tension spring 14 is tensioned by the pivoting of the first frame 8, so that a returning force occurs, which has the result after ending the force action that the first frame 8 is moved back into its nominal position again.

The above-described embodiments for the reversible movement of the first frame 8 in relation to the second frame 9 are solely by way of example and the reversible movement can also be achieved by returning devices other than springs or by another arrangement of the corresponding springs. For example, returning springs can also be arranged circumferentially around the first frame or the cover plate, by which a corresponding returning force is generated in the manner of a trampoline. Mounting of the first frame in the manner of a washing machine drum mounting known per se can also be implemented.

The above-described embodiments of the invention have an array of advantages. In particular, a function module for at least one light function and/or sensor function in a motor vehicle is provided, in which it is ensured that in the event of a moderate force action from the outside, for example, denting while parked, a movement of the front part of the function module having a cover plate fastened thereon is enabled, by which damage to the function module is counteracted. At the same time, it is ensured by a corresponding returning device that after ending of the force action, the function module is moved back into its nominal position again.

LIST OF REFERENCE SIGNS

1 function module
2 cover plate
2a transmissive layer
2b opaque layer
2c protruding section on the cover plate
3, 3' lighting units for low beams and high beams
4, 4' signal lighting units (lighting units for position light, daytime running light, and directional indicator)
4a light of the signal lighting unit
4b housing of the signal lighting unit
4c reflector of the signal lighting unit
5 contour lighting device
5a light guide of the contour lighting device
5b housing of the contour lighting device
5c screen
6 surface lighting device
7 radar
8 first frame
8a depression in the first frame
8b, 8c protruding sections of the first frame
9 second frame
9a, 9b protruding sections of the second frame
10 cover
10a stop of the cover
11 bumper panel
12 vehicle-fixed parts
13 flexible jacket (sealing collar)
14 returning device (springs)
15 supporting frame
16 cupola-shaped elevations
17 catch lugs
18 fastening points
19 holding element
19a front end of the holding element
20 rotating fastener
21 supporting frame
P1, P2 arrows to represent a pendulum impact
P' double arrow to represent the rotational movement of the first frame

The invention claimed is:

1. A function module for at least one light function and/or at least one sensor function in a motor vehicle, the function module comprising:
    at least one lighting unit for emitting light into surroundings of the motor vehicle and/or at least one sensor unit for detecting objects in a detection area in the surroundings of the motor vehicle;
    a cover plate via which light of the at least one lighting unit exits from the function module and/or via which the detection area of a respective sensor unit extends out of the function module;
    a first frame and a second frame, wherein the cover plate is provided on the first frame and the second frame is configured for rigid fastening on the motor vehicle, and the first frame is movable out of a nominal position relative to the second frame in an event of a force action directed on the first frame from outside toward the cover plate; and a returning device that is configured to move the first frame back into the nominal position after ending of the force action, wherein the force action acts directly on the first frame and indirectly on the cover plate via the first frame.

2. The function module according to claim 1, wherein the at least one lighting unit comprises at least one first lighting unit for generating a light distribution for a low beam function and/or a high beam function.

3. The function module according to claim 2, wherein the at least one first lighting unit is connected to the second frame.

4. The function module according to claim 1, wherein the at least one lighting unit comprises at least one second lighting unit for generating a light distribution for a daytime running light and/or for a position light and/or for a directional indicator and/or for a surface lighting device along the cover plate and/or for a contour lighting device along an edge of the cover plate.

5. The function module according to claim 4, wherein the at least one second lighting unit is connected to the cover plate and/or the first frame.

6. The function module according to claim 1, wherein at least a first one of the at least one sensor unit is configured to detect objects in the detection area via emission and reception of electromagnetic radiation.

7. The function module according to claim 6, wherein at least a second one of the at least one sensor unit is a radar sensor and/or at least a third one of the at least one sensor unit is a lidar sensor.

8. The function module according to claim 1, wherein the first frame is displaceable and/or pivotable relative to the second frame in the event of the force action directed on the first frame from the outside toward the cover plate.

9. The function module according to claim 1, wherein the returning device connects the first frame to the second frame at least at one first point and/or is provided at least at one second point for connecting the first frame to a fixed part in the motor vehicle not associated with the function module.

10. The function module according to claim 1, wherein the returning device comprises at least one elastic element.

11. The function module according to claim 1, wherein the returning device comprises at least one spring.

12. The function module according to claim 1, wherein a plurality of elastic elements, in a top view of the cover plate, are arranged at an edge of the first frame.

13. The function module according to claim 12, wherein the plurality of elastic elements are arranged circumferentially around the edge.

14. The function module according to claim 1, wherein the first frame is guided relative to the second frame in order to only permit a movement of the first frame relative to the second frame n a number of predetermined directions in the event of the force action directed on the first frame from the outside toward the cover plate.

15. The function module according to claim 14, wherein at least one cupola-shaped elevation and/or at least one rotating fastener on the first frame are provided for guiding the first frame relative to the second frame.

16. The function module according to claim 1, wherein:
a locking device is provided to lock the first frame in the nominal position, and
the locking device is configured such that locking is released from the nominal position in the event of the force action on the first frame from the outside toward the cover plate being above a predetermined amount.

17. The function module according to claim 16, wherein the locking device comprises one or more catch lugs, which engage in one or more corresponding depressions upon locking in the nominal position.

18. The function module according to claim 1, wherein:
the first frame is a first housing section and the second frame is a second housing section, and
the first housing section and the second housing section are connected to one another in a sealing manner and form a closed housing, in which at least one of the at least one lighting unit and/or at least one of the at least one sensor unit are arranged.

19. The function module according to claim 18, wherein a flexible jacket and/or a hollow chamber seal is provided for a sealing connection of the first housing section to the second housing section.

20. A motor vehicle comprising the function module according to claim 1.

\* \* \* \* \*